United States Patent [19]

Kraft et al.

[11] Patent Number: 4,480,950

[45] Date of Patent: Nov. 6, 1984

[54] CUTTING TOOL

[75] Inventors: Harald Kraft, Uhingen; Peter Leimanis, Altbach, both of Fed. Rep. of Germany

[73] Assignee: Feldmühle Aktiengesellschaft, Dusseldorf, Fed. Rep. of Germany

[21] Appl. No.: 413,463

[22] Filed: Aug. 31, 1982

[30] Foreign Application Priority Data

Sep. 15, 1981 [DE] Fed. Rep. of Germany ....... 3136549

[51] Int. Cl.³ .............................................. B26D 1/00
[52] U.S. Cl. .................................... 407/103; 407/109
[58] Field of Search ............... 407/102, 103, 107, 109, 407/14, 42, 48

[56] References Cited

U.S. PATENT DOCUMENTS 2,716,801  9/1955  Kraus ................................... 407/48
3,754,309  8/1973  Jones et al. ......................... 407/107

FOREIGN PATENT DOCUMENTS 2166991  4/1977  Fed. Rep. of Germany ...... 407/112
2302806  3/1976  France ............................... 407/112
1246464  9/1971  United Kingdom ................ 407/109

Primary Examiner—Leonidas Vlachos
Attorney, Agent, or Firm—Toren, McGeady and Stanger

[57] ABSTRACT

A cutting tool, such as a turning tool, includes a clamping holder with a recess in one of its surfaces, a cutting bit insertable into the recess, and a clamping shoe secured to the clamping holder by a clamping bolt. The clamping shoe has a projecting member engageable within a depression located in the surface of the cutting bit for securing the cutting bit in the recess of the clamping holder. The depression is defined in the surface of the cutting bit by a closed line formed in part by convexly curved first lines and by second lines interconnecting the ends of the first lines. The depression, as viewed in plan, has an oblong or star-shaped configuration. The lines defining such configuration can be convex, concave or rectilinear. The surface of the depression within the closed line is formed by a radius centered at points located outwardly from the surface of the cutting bit containing the depression. Accordingly, the length of the radius is greater than the depth of the depression. The projecting member on the clamping shoe has a half-barrel or half-cylinder shape so that it forms a punctiform contact with the surface in the depression.

10 Claims, 15 Drawing Figures

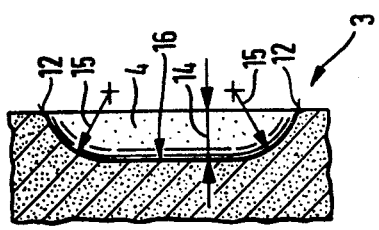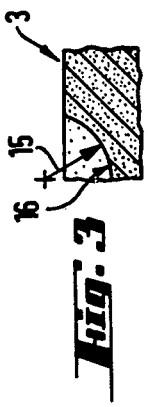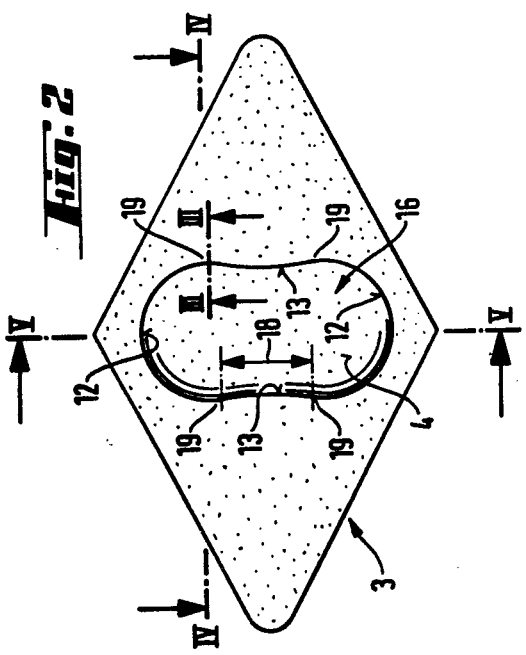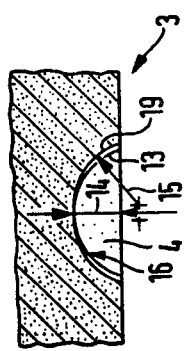

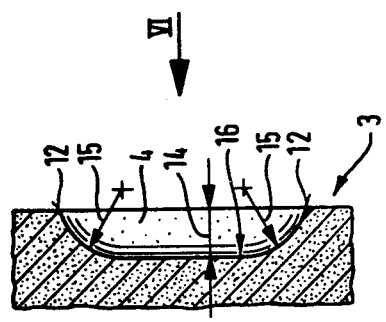
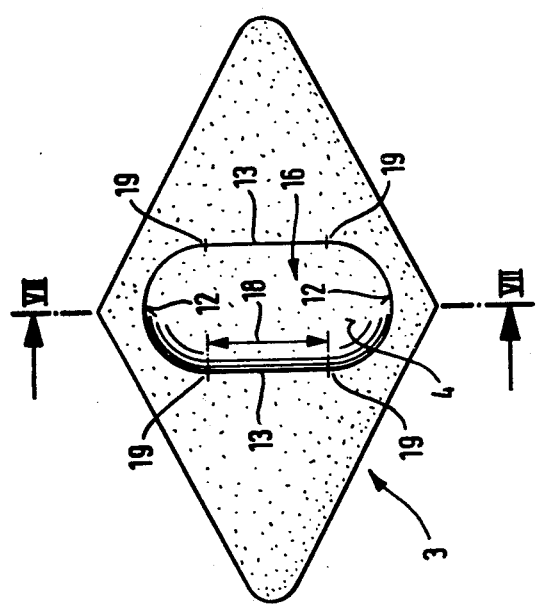

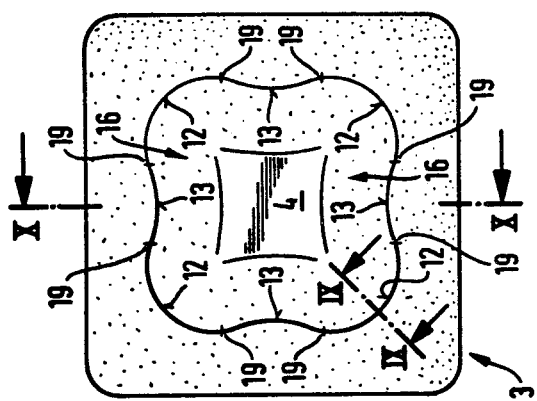
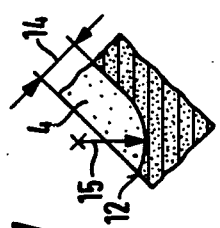
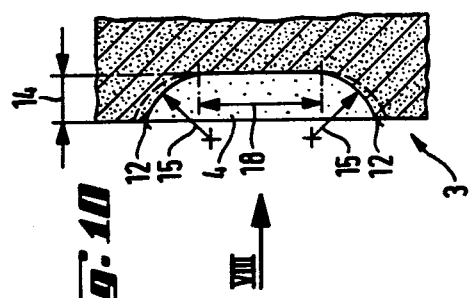

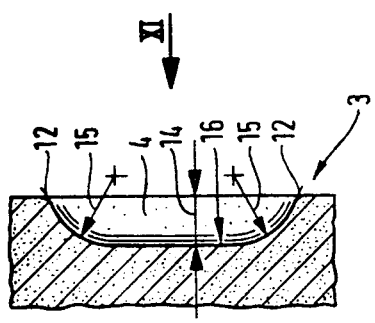
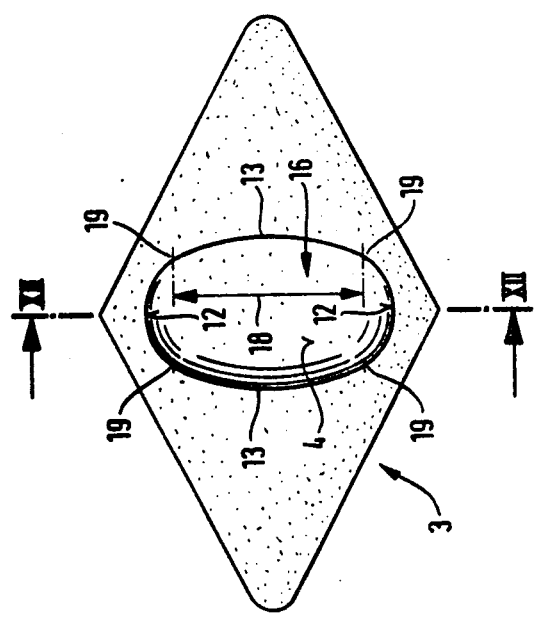

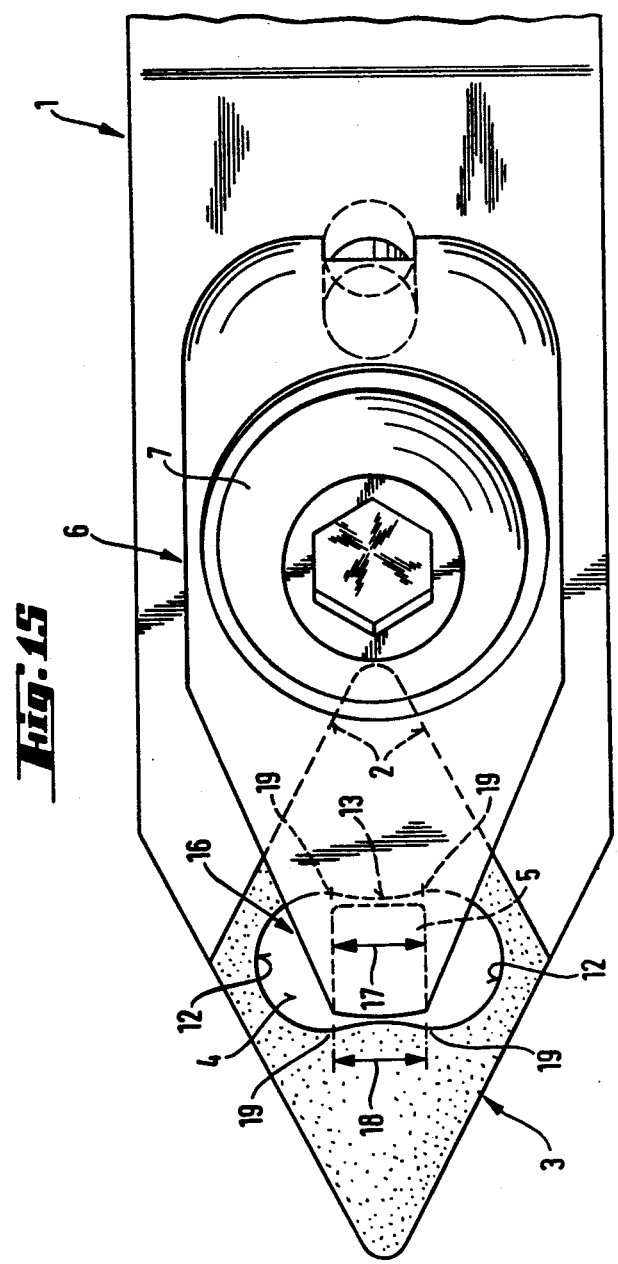

CUTTING TOOL

SUMMARY OF THE INVENTION

The present invention is directed to a cutting tool, such as a turning tool, made up of a clamping holder with a recess in one surface for receiving a cutting bit. The cutting bit has a depression into which a projecting member on a clamping shoe seats and the clamping shoe is secured to the clamping holder by a clamping bolt.

A cutting tool of this general type is disclosed in Federal Republic of Germany Offenlegungsschrift No. 26 20 201. The tool includes a cutting plate or bit with a depression or recess on its upwardly facing side and the depression extends substantially parallel to the underside of a clamping shoe and a projecting member on the shoe presses against the cutting plate in the depression so that there is a flat support of the clamping shoe in the depression. The pressure exerted by the clamping shoe extends parallel to the axis of the clamping bolt which tightens the shoe against the clamping holder. Due to such construction, no draw cuts can be performed with the tool under a high load if large chip cross-sections are to be removed, since the cutting plate becomes displaced in the holder recess. Moreover, it cannot be assured that the cutting bit always maintains the same seat when it is replaced, since the user must exercise care to assure that it is inserted accurately into the holder recess.

Therefore, it is the primary object of the present invention is to provide a cutting tool with a replaceable cutting bit in which the cutting bit is held during a draw cut and is automatically placed in its fixed position when the cutting bit is replaced.

Where cutting bits are exposed to small loads, and where such small loads may be mechanical or thermal in nature, it is usual to provide the cutting bit with a through-hole, generally conically shaped in which a threaded pin is engaged and the pin has a frusto-conically shaped head. By tightening the pin the cutting bit is pressed against stop faces on the holder and is fixed in position against any displacement. Such an arrangement is disclosed in U.S. Pat. No. 3,341,923. Such through-holes or openings, however, generally weaken the cutting bits so that large chip cross-sections cannot be worked at high temperatures or high pressures, since such conditions would tend to break the cutting bit. Therefore, another primary object of the present invention is to prevent breakage of the cutting bit.

The objects of the present invention are achieved in a cutting tool embodying the following characteristic features:

(a) The depression in the surface of the cutting bit or insert is defined by at least two substantially equal convexly curved lines and by other lines connecting the ends of these curved lines forming a closed line and defining an oblong or star-shaped depression in the surface of the cutting bit.

(b) The depth of the depression from the surface of the cutting bit is defined by a radius.

(c) The radius forming the surface of the depression is centered at a point spaced from the surface of the cutting bit containing the depression so that the length of the radius is greater than the depth of the depression.

(d) The projecting member on the clamping shoe is in punctiform contact with the surface of the depression when the shoe holds the cutting bit within the recess in the clamping holder.

With this special arrangement of the depression in the cutting bit, it is possible to employ oxide ceramic materials, such as aluminum oxide or zirconium oxide, as the material for the cutting bit and, at the same time, form the depression in the bit so that it does not lead to any strength reduction resulting in breakage of the bit. For a long period of time, oxide ceramic materials have been compressed and sintered for forming cutting bits. In the past, however, it has not been possible to form the depressions in the cutting bit which permitted a centering of the bit when it is exposed to high loads. Because the depression is defined in the surface of the cutting bit by curves, no sharp edges are present, and the powder to be pressed, that is, the oxide ceramic powder, is not only more easily compressed but the powder flows more uniformly and a uniform pressing action is achieved in the formation of the cutting bits. As a result, a more uniform strength is attained over the cross-section of the cutting bit so that it is resistant to breakage.

In the present invention, the clamping shoe does not contact the cutting bit with a flat contact area, such as in the Federal Republic of Germany Offenlegungsschrift No. 26 20 201 or with a linear contact as in U.S. Pat. No. 3,341,923, rather a punctiform contact is effected. Such punctiform contact results, on one hand, from the configuration of the depression in the cutting bit and, on the other hand, from the shape of the projecting member on the clamping shoe. After a cutting bit has been inserted into the recess in the clamping holder, the projecting member on the clamping shoe contacts the depression in the cutting bit as the shoe is tightened onto the clamping holder with the projecting member arranged in point contact with the surface within the depression. As the clamping shoe is tightened onto the clamping holder, pressure is exerted. With such exertion of pressure, the contact point shifts in the depression of the cutting bit in the downward direction. The shifting movement generates a lateral force displacing the cutting bit against the border of the recess in the clamping holder so that the cutting bit is properly seated in the recess. By further tightening of the clamping bolt to the clamping holder, the cutting bit is firmly anchored in the desired position.

In accordance with the different embodiments of the present invention, the combination of the convexly curved lines and the lines connecting such curved lines combine to form an oblong or star-shaped depression. The connecting lines may be convexly curved lines or straight lines. In such an embodiment, the projecting member on the clamping shoe has a half-barrel shape to assure the punctiform contact of the projecting member with the surface of the depression in the cutting bit. If the connecting lines are concavely shaped lines, in accordance with one preferred embodiment of the invention, then it is advantageous if the projecting member on the clamping shoe has the shape of a half-cylinder.

An advantageous feature of the present invention is that the width of the projecting member on the clamping shoe is equal or less than the spacing between the ends of the convexly curved lines defining the edge of the depression. With such an arrangement it is possible to use higher tolerances in the production of the clamping holder and the clamping shoe. Because of this feature, the borehole in the clamping holder, into which the clamping bolt is threaded, need not be related to the recess in the clamping holder with absolute accuracy, since the point support of the projecting member acts on a larger area of the depression so that the projecting member has sufficient play to adjust itself at the center of pressure, even if it engages in the depression at a different angle because of manufacturing tolerances.

In a preferred embodiment of the invention, the maximum radius of the half-barrel shaped or half-cylinder shaped projecting member on the clamping shoe amounts to about 60 to 80 percent of the radius dimension of the surface within the depression in the cutting bit. Further, through this feature of the invention, the machining accuracy required in the production of the clamping holder or of the clamping shoe can be reduced. As a result, it is possible to form the clamping shoe in a casting process.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is a plan view of a prismatic cutting bit having a depression defined around its edge by alternating convexly shaped lines and concavely shaped lines;

FIG. 3 is a partial sectional view taken along the line III—III in FIG. 2;

FIG. 4 is a partial sectional view taken along the line IV—IV in FIG. 2;

FIG. 5 is a partial sectional view taken along line V—V in FIG. 2;

FIG. 6 is a view of a cutting bit similar to the one shown in FIG. 2, however, the edge extending around the depression is defined by convexly curved lines and straight lines;

FIG. 7 is a partial sectional view taken along the line VII—VII in FIG. 6;

FIG. 8 is a plan view of a substantially square cutting bit with a star-shaped depression;

FIG. 9 is a partial sectional view taken along the line IX—IX in FIG. 8;

FIG. 10 is a partial sectional view taken along the line X—X in FIG. 8;

FIG. 11 is a plan view of a rhombic-shaped cutting bit with the edge of the depression in the bit defined by convexly curved lines;

FIG. 12 is a partial sectional view taken along the line XII—XII in FIG. 11;

FIG. 15 is a plan view of the assembled clamping holder, clamping shoe, clamping bolt and cutting bit.

DETAILED DESCRIPTION OF THE INVENTION

Figure 1:
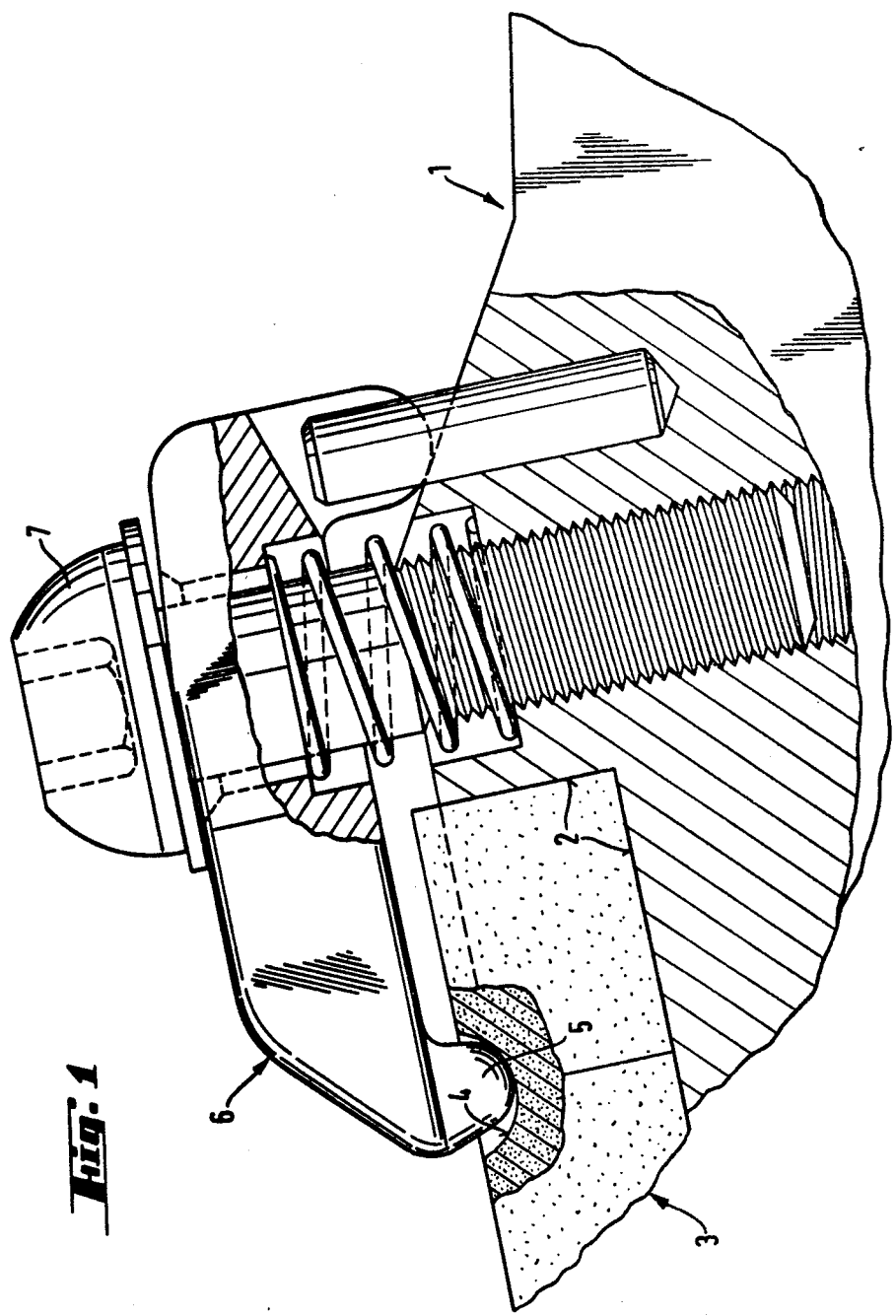
FIG. 1 is a side view, partly in section, of a clamping holder, a clamping shoe and a cutting bit embodying the present invention.
Figure 14:
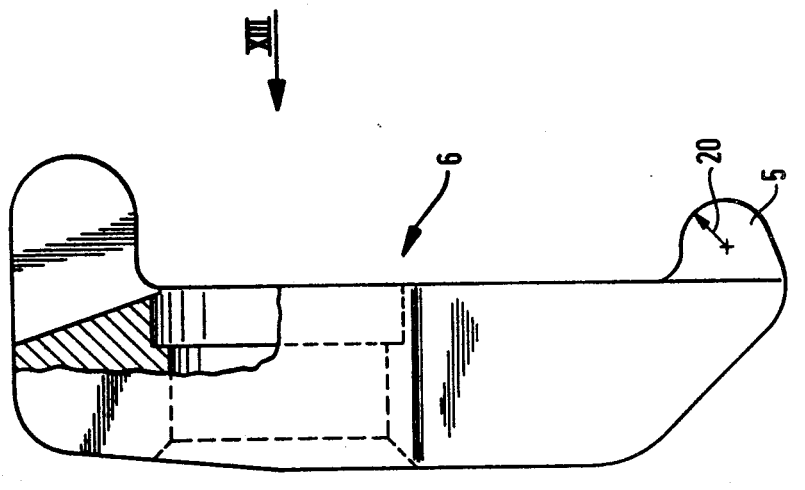
FIG. 14 is a side view, partly in section, of the clamping shoe.
Figure 13:
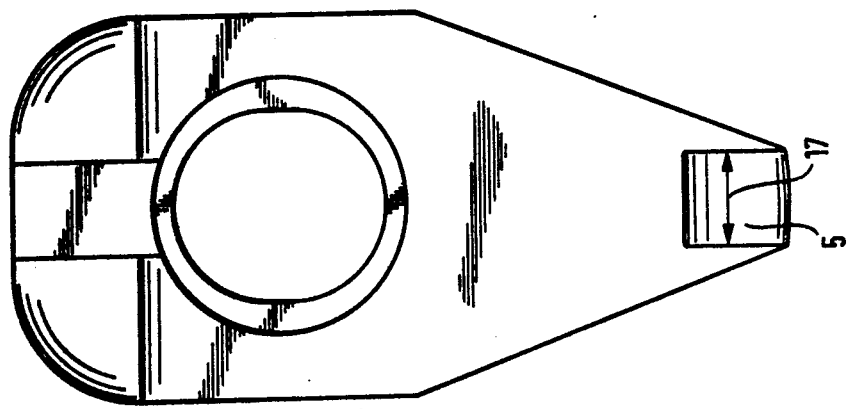
FIG. 13 is a bottom view of the clamping shoe.

In FIGS. 1 and 15 a clamping holder 1 is illustrated. The clamping holder 1 has a recess 2 in one of its surfaces and a cutting bit 3 is positioned in the recess. A centering recess or depression 4 is formed in the surface of the bit 3 facing upwardly from the clamping holder 1 and a projecting member 5 on a clamping shoe 6 seats in punctiform contact within the depression 4. Clamping shoe 6 is connected by a clamping bolt 7 to the clamping holder 1. In the different embodiments of the cutting bit 3 shown in FIGS. 2–12, the same reference numerals are used and the convexly curved lines 12 define opposite ends of the depressions 4. Transition points 19 are located between the convexly curved lines 12 and the concave lines 13, as shown in FIG. 2. The transition points 19 define the opposite ends of the convexly curved lines 12. Within the depression defined by the closed line made up of the lines 12 and 13, the surface is rounded and formed by a radius 15 with the center point of the radius located outwardly from the surface of the cutting bit 3 in which the depression 4 is formed. With the center point of the radius 15 located outwardly from the surface of the cutting bit 3, the maximum depth 14 of the depression is less than the length of the radius 15. Because of the formation of the surface of the depression 4 as a radius surface 16 the bottom has an arched or rounded configuration. The distance 18, note FIGS. 2, 6, 10 and 11, is the dimension between the transition points 19 or the length between the adjacent ends of different ones of the convexly curved lines 12.

As shown in FIG. 15, projecting member 5, extending downwardly from the clamping shoe 6, has a width or dimension 17 equal or less than the dimension 18 extending between the transition points 19 between the lines 12 and 13 located at opposite ends of the depression 4.

As can be seen in FIGS. 2–5 the opposite end parts of the depression 4 are generally spherically shaped with the surface having a radius 15 formed about the center points spaced outwardly from the surface of the cutting bit 3. As can be seen in FIG. 4 the center points for the radii 15 are spaced closely apart. Between the transition points 19, the concavely shaped lines 13 bow inwardly. As a result, the surfaces 16 within the depression 4 have a similarly curved surface. Accordingly, the surfaces 16 downwardly from the lines 13 bow inwardly toward one another and gradually provide the rounded surface for the bottom of the depression as shown in FIG. 4. Accordingly, when a half-cylinder shaped projecting member 5 is pressed against the surface of the depression 4, note FIG. 1, the projecting member contacts the inwardly bowed surface of the recess in the region of the dimension 18 affording a punctiform contact.

As distinguished from the depression 4 shown in FIG. 2, the depression 4 in FIG. 6 has straight or rectilinear lines 13 defining the edge of the depression extending between the transition points 19. In this embodiment, a half-barrel shaped projecting member 5 is used for contact with the surface of the depression 4 in the range of the dimension 18. Since the surface of the half-barrel shaped projecting member bows outwardly, when it is pressed into contact with the surface of the depression 4 in FIG. 6, a punctiform contact is provided.

In FIGS. 11 and 12 another variation is shown of the general arrangement of the depression 4 shown in FIGS. 2 and 6. In this particular embodiment, the lines 13 extending between the transition points 19 are convexly shaped, providing outwardly bowed side surfaces as distinguished from the inwardly bowed surfaces shown in FIG. 2. If a half-barrel shaped projecting member 5 is used in this arrangement because of the difference in radius between the projection member 5 and the surface 16 point contact with the surface of the depression takes place. If a half-cylinder shaped projecting member 5 is utilized it presses against the surface 16 within the depression 4 in punctiform contact, but the punctiform contact would be effected at two locations on the cylinder spaced apart in the direction of the dimension 18.

In FIG. 8 instead of the oblong configuration of the depression 4 displayed in the other embodiments, the depression 4 has a star-shaped configuration with the points of the star formed by the convexly curved lines 12 and the section between the points formed by the concavely shaped lines 13. Accordingly, the star-shaped depression has alternating convexly curved lines 12 and concavely curved lines 13 forming the closed line edge of the depression. Note in FIG. 8 the transition points 19 between the ends of the lines 12 and 13.

While in FIG. 8 the lines 13 are shown concavely shaped, these lines could also be straight or rectilinear.

With the concavely shaped surfaces afforded by the lines 13 defining the edge of the depression 4, a half-cylinder shaped projecting member would be used to assure the punctiform contact. When the projecting member 5 on the clamping shoe 6 is pressed against the surface 16 in the range of the dimension 18 within the depression 4 the cutting bit is pressed against the surfaces within the recess 2 in the clamping member 1 assuring that the bit it properly seated and held securely in place.

The shape of the depression 4 assures the centering of the projecting member 5 in the region of the dimension 18. If the projecting member 5 contacts one of the end portions of the depression defined laterally by a convexly curved line 12, the pressure applied to the clamping shoe 6 causes the projecting member 5 to ride downwardly on the end surface and to move into contact with the surface 16 in the region of the dimension 18. Further pressure causes the projecting member to move on the surface of the dimension 18 into a position such as shown in FIG. 1. The rounded shape of the projecting member 5 and its relation to the rounded surface 16 of the depression 4 assures the requisite point contact.

While specific embodiments of the invention have been shown and described in detail to illustrate the application of the inventive principles, it will be understood that the invention may be embodied otherwise without departing from such principles.

We claim:

1. A cutting tool, such as a turning tool, comprising a clamping holder having a recess therein, a cutting bit insertable and securable within said recess, said cutting bit having a depression in the surface of said bit facing outwardly from said recess, a clamping shoe mounted on said clamping holder, a projecting member located on and extending outwardly from said clamping shoe so that said projecting member is arranged to engage within said depression for securing said cutting bit on said clamping holder, means for securing said clamping shoe to said clamping holder, said depression is defined in the surface of said cutting bit by a closed line forming the edge of said depression and including at least two convexly curved first lines, each of said first lines being spaced apart from the other and each having a pair of ends with the ends spaced apart from the ends of the at least other said first line, and second lines each extending between and interconnecting one end on each of two of the spaced said first lines and forming, in combination with said first lines, said closed line, the surface of said depression within said closed line is formed by a radius with the center of the radius spaced outwardly from the surface of said cutting bit containing said closed line so that said radius is longer than the maximum depth of said depression, and said projecting member on said clamping shoe is shaped so that when it is placed in contact with the surface of said depression inwardly of said closed line it is only in punctiform contact with the surface of said depression and the surface of said depression contacted by said projecting member is defined between said second lines.

2. A cutting tool, as set forth in claim 1, wherein said second lines are rectilinear lines.

3. A cutting tool, as set forth in claim 1, wherein said second lines are convexly curved lines.

4. A cutting tool, as set forth in claim 1, wherein said second lines are concavely shaped lines.

5. A cutting tool, as set forth in claims 1, 3 or 4, wherein said projecting member on said clamping shoe is shaped as a half-cylinder.

6. A cutting tool, as set forth in claims 1, 2 or 4, wherein said projecting member on said clamping shoe is shaped as a half-barrel.

7. A cutting tool, as set forth in claims 1, 2, 3 or 4, wherein the dimension of said projecting member measured in the direction extending between said first lines is equal to or less than the dimension of said second lines extending between the ends of said first lines.

8. A cutting tool, as set forth in claims 1, 2, 3 or 4, wherein said projecting member having a rounded surface contacting the surface in said depression and the rounded surface of said projecting member having a maximum radius in the range of 60 to 80 percent of the radius of the surface within said depression.

9. A cutting tool, as set forth in claim 1, wherein said depression is elongated in the direction extending between said first lines and said depression has an oblong shape.

10. A cutting tool, as set forth in claim 1, wherein said depression has a generally square shape.

* * * * *